US010823615B2

(12) United States Patent
Ooi et al.

(10) Patent No.: US 10,823,615 B2
(45) Date of Patent: Nov. 3, 2020

(54) HYPERSPECTRAL IMAGING APPARATUS AND METHOD

(71) Applicant: Agency for Science, Technology and Research, Singapore (SG)

(72) Inventors: Zi En Ooi, Singapore (SG); Jie Zhang, Singapore (SG); Siew Lay Lim, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 252 days.

(21) Appl. No.: 15/749,751

(22) PCT Filed: Aug. 4, 2016

(86) PCT No.: PCT/SG2016/050376
§ 371 (c)(1),
(2) Date: Feb. 1, 2018

(87) PCT Pub. No.: WO2017/023209
PCT Pub. Date: Feb. 9, 2017

(65) Prior Publication Data
US 2018/0224332 A1    Aug. 9, 2018

(30) Foreign Application Priority Data

Aug. 4, 2015 (SG) .............................. 10201506106

(51) Int. Cl.
*G01J 3/28* (2006.01)
*G01J 3/26* (2006.01)
*G01J 3/02* (2006.01)

(52) U.S. Cl.
CPC ........... *G01J 3/2823* (2013.01); *G01J 3/0208* (2013.01); *G01J 3/0229* (2013.01); *G01J 3/26* (2013.01); *G01J 2003/2826* (2013.01)

(58) Field of Classification Search
None
See application file for complete search history.

(56) References Cited

U.S. PATENT DOCUMENTS 7,433,042 B1 * 10/2008 Cavanaugh ............... G01J 3/02
356/419
8,665,440 B1 * 3/2014 Kompaniets ........... G01N 21/31
356/402

(Continued)

OTHER PUBLICATIONS

International Preliminary Report on Patentability issued by the International Bureau of WIPO for International Application No. PCT/SG2016/050376 dated Feb. 6, 2018, pp. 1-7.

(Continued)

*Primary Examiner* — Shawn Decenzo
(74) *Attorney, Agent, or Firm* — Winstead PC (57) ABSTRACT

Various embodiments provide a hyperspectral imaging apparatus. The hyperspectral imaging apparatus includes a micro-lens array having a plurality of micro-lenses; and a filter array having a plurality of tunable filters. Each of the plurality of tunable filters is optically coupled to a respective micro-lens of the plurality of micro-lenses. Each micro-lens and the corresponding coupled tunable filter are configured to generate a spectrally filtered image of a scene, such that the micro-lens array and the filter array generate a plurality of spectrally filtered images of the scene for receiving by a plurality of areas of an image sensor. Each of the plurality of tunable filters is tunable to transmit a selected wavelength within a respective spectral band, wherein the spectral bands of the plurality of tunable filters are different from each other.

12 Claims, 9 Drawing Sheets

(56) References Cited

U.S. PATENT DOCUMENTS

| | | | |
|---|---|---|---|
| 9,366,573 B2* | 6/2016 | Geelen | G01J 3/0235 |
| 9,948,868 B2* | 4/2018 | Lin | G02B 3/0006 |
| 10,645,281 B1* | 5/2020 | Yu | H04N 5/2226 |
| 2014/0192255 A1* | 7/2014 | Shroff | G01N 21/27 348/362 |
| 2014/0193061 A1 | 7/2014 | Miller | |
| 2014/0267849 A1* | 9/2014 | Geelen | G01J 3/2823 348/278 |
| 2014/0267878 A1* | 9/2014 | Geelen | G01J 3/0264 348/342 |
| 2015/0032402 A1* | 1/2015 | Menon | G06K 9/4652 702/104 |
| 2015/0069239 A1* | 3/2015 | Kester | G01J 3/2823 250/332 |
| 2015/0204789 A1* | 7/2015 | Akkus | G01J 3/44 702/196 |
| 2016/0245698 A1* | 8/2016 | Pau | G01J 3/2803 |
| 2020/0096677 A1* | 3/2020 | Stanley | G02B 3/0068 |

OTHER PUBLICATIONS

Written Opinion of the International Searching Authority for International Application No. PCT/SG2016/050376 dated Oct. 11, 2016, pp. 1-6.

Shogenji et al., "Multispectral Imaging Using Compact Compound Optics," Optics Express, vol. 12, No. 8, Apr. 19, 2014, pp. 1643-1655.

Gat, Nahum, "Imaging Spectroscopy Using Tunable Filters: A Review," SPIE Wavelet Applications VII, vol. 4056, Apr. 24, 2000, pp. 50-64.

Hagen et al., "Review of Snapshot Spectral Imaging Technologies," Optical Engineering, vol. 52, No. 9, Sep. 23, 2013, pp. 090901-(1-23).

Gupta et al., "Development of a Miniature Snapshot Multispectral Imager," Army Research Laboratory, ARL-TR-5320, Sep. 2010, pp. 1-26.

IMEC, "Hyperspectral Imaging 2015 Activity Update," Introduction, Jan. 2015, pp. 1-39.

IMEC, "Hyperspectral Imaging," Retrieved on Mar. 22, 2015 from http://www2.imec.be/content/user/File/Brochures/2_imec_HSI_technology.pdf, pp. 1-29.

Gupta Neelam, "Hyperspectral Imager Development at Army Research Laboratory," Infrared Technology and Applications XXXIV, Proc. of SPIE vol. 6940, 69401P, 2008, pp. 1-10.

Wikipedia, "Hyperspectral imaging," Retrieved on Mar. 22 and 23, 2015 from http://en.wikipedia.org/wiki/Hyperspectral_imaging, pp. 1-8.

IMEC, "Hyperspectral Imaging," Retrieved on Mar. 22, 2015 from: http://www.tsensorssummit.org/Resources/19-IMEC.pdf, pp. 1-29.

Amigo et al., "Hyperspectral Imaging and Chemometrics: A Perfect Combination for the Analysis of Food Structure, Composition and Quality," Chapter 9, Data Handling in Science and Technology, vol. 28, http://dx.doi.org/10.1016/B978-0-444-59528-7.00009-0, pp. 343-370.

* cited by examiner

HYPERSPECTRAL IMAGING APPARATUS AND METHOD

CROSS-REFERENCE TO RELATED APPLICATIONS

The present application claims the benefit of the Singapore patent application No. 10201506106R filed on 4 Aug. 2015, the entire contents of which are incorporated herein by reference for all purposes.

TECHNICAL FIELD

Embodiments relate generally to a hyperspectral imaging apparatus and a hyperspectral imaging method.

BACKGROUND

A hyperspectral image can be thought of in two equivalent ways: 1) a stack of optical images, each one at a slightly different wavelength of light; and 2) an optical image in which each individual pixel contains full spectral information of the incoming light.

Hyperspectral imaging can therefore provide spatial and spectral information of non-homogeneous surfaces/samples, and has applications in microscopy, remote atmospheric sensing, military aerial photography, detection of food contaminants, detection of skin disease, art conservation, astronomy, etc. The spectral information is valuable because it can be used to identify specific substances in an image (e.g. for gemstone identification/verification), or simply provide accurate colour information if colour matching is required (e.g. for cosmetic tone matching).

A hyperspectral image is represented by a 3-dimensional data cube (x, y and $\lambda$), where x and y represent two spatial dimensions of the scene, and $\lambda$ represents the spectral dimension including a range of wavelengths. Current image sensors like CCD (charge coupled device) and CMOS (complementary metal-oxide-semiconductor) sensors are 2-dimensional in nature. In order to obtain a data cube from a flat image sensor, a few approaches are typically employed.

In spatial scanning, temporal sampling of the dimension x or y is performed. A grating or prism is used with a slit width, so that the image sensor captures a linear image (x or y) in one direction, plus the spectral information in the other direction. A complete 2D image is captured as the slit is swept across the scene (or scene across the slit). This is effectively a basic spectrometer moving at a fixed/predictable speed.

In spectral scanning, temporal sampling of $\lambda$ is performed. A grating, prism, etalon or some other tunable filter is used to filter the incoming image into narrow spectral bands. The image sensor then captures one monochromatic image at a time. As the tunable filter scans across the spectral range, a data cube is captured.

The spatial scanning and spectral scanning can provide the highest spatial and spectral resolution. However, since time is required for scanning, these two approaches prohibit imaging of changing scenes or video applications (i.e. poor time resolution).

Another approach is snapshot hyperspectral imaging technology which performs spatial sampling of $\lambda$. The image of a scene is split into an array of images, all identical except that each image is at a particular spectral band. Each spectrally separate image falls on a different area of the image sensor. The array of images is captured all at once on the image sensor. This method enables a single-exposure capture of a data cube, but compromises on both spatial and spectral resolution.

Figure 1:
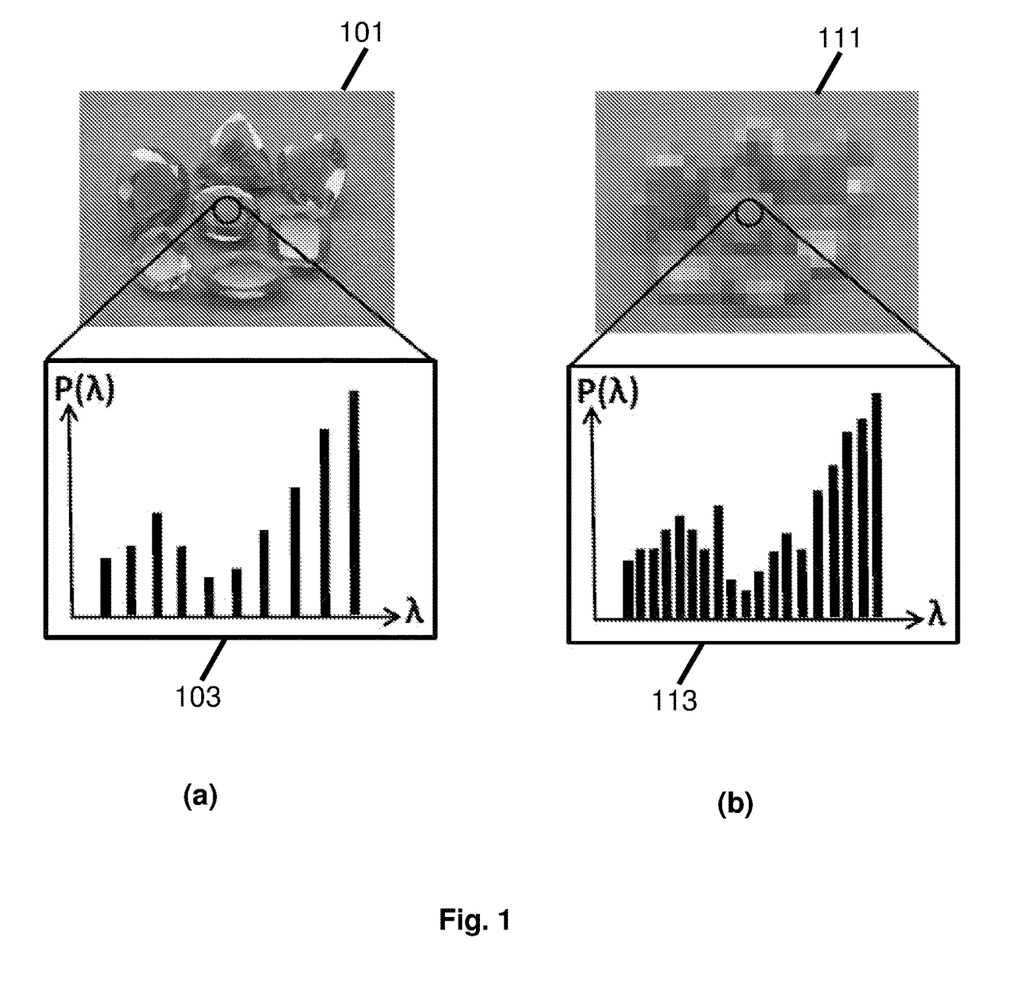
FIG. 1 illustrates a tradeoff between spatial resolution and spectral resolution using the current snapshot hyperspectral imaging technology.

FIG. 1 illustrates a tradeoff between spatial resolution and spectral resolution using the current snapshot hyperspectral imaging technology. When a high spatial resolution is used to obtain a high spatial resolution image 101 as shown in FIG. 1(a), the corresponding spectral resolution is low as depicted by the spectrum 103 of a pixel in the image 101. Whereas when a low spatial resolution is used to obtain a low spatial resolution image 111 as shown in FIG. 1(b), the corresponding spectral resolution is high as depicted by the spectrum 113 of the pixel in the image 111.

In addition, hyperspectral imagers are generally bulky and expensive instruments, making it unsuitable for mobile applications.

SUMMARY

Various embodiments provide a hyperspectral imaging apparatus. The hyperspectral imaging apparatus includes a micro-lens array having a plurality of micro-lenses; and a filter array having a plurality of tunable filters. Each of the plurality of tunable filters is optically coupled to a respective micro-lens of the plurality of micro-lenses. Each micro-lens and the corresponding coupled tunable filter are configured to generate a spectrally filtered image of a scene, such that the micro-lens array and the filter array generate a plurality of spectrally filtered images of the scene for receiving by a plurality of areas of an image sensor. Each of the plurality of tunable filters is tunable to transmit a selected wavelength within a respective spectral band, wherein the spectral bands of the plurality of tunable filters are different from each other.

Various embodiments further provide a hyperspectral imaging method. The method includes receiving a first set of spectrally distinct images of a scene generated at a first image capture time; and receiving a second set of spectrally distinct images of the scene generated at a second image capture time different from the first image capture time. The second set of spectrally distinct images are generated at different wavelengths from the first set of spectrally distinct images. The hyperspectral imaging method may further include determining a spectrum for each pixel based on the first set of spectrally distinct images and the second set of spectrally distinct images; and combining the first set of spectrally distinct images and the second set of spectrally distinct images into a composite image having spectral information of the scene.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized, and structural and logical changes may be made without departing from the scope of the invention. The various embodiments are not necessarily mutually exclusive, as some embodiments can be combined with one or more other embodiments to form new embodiments.

Various embodiments provide a hyperspectral imaging apparatus and method which can achieve high spatial and spectral resolutions in a time-efficient manner. In addition, various embodiments provide a hyperspectral imaging apparatus in a simple structure which is suitable for mobile and portable applications.

Figure 2:
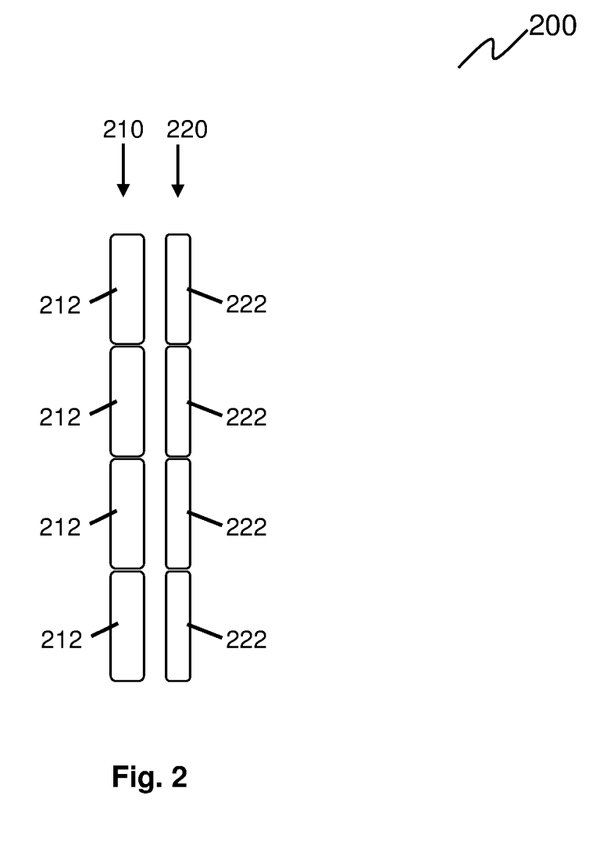
FIG. 2 shows a schematic diagram illustrating a hyperspectral imaging apparatus according to various embodiments.

FIG. 2 shows a schematic diagram 200 illustrating a hyperspectral imaging apparatus according to various embodiments in a side view.

According to various embodiments, a hyperspectral imaging apparatus may include a micro-lens array 210 having a plurality of micro-lenses 212, and a filter array 220 having a plurality of tunable filters 222. Each filter 222 of the plurality of tunable filters is optically coupled to a respective micro-lens 212 of the plurality of micro-lenses 212. Each micro-lens 212 and the corresponding coupled tunable filter 222 are configured to generate a spectrally filtered image of a scene, such that the micro-lens array 210 and the filter array 220 generate a plurality of spectrally filtered images of the scene for receiving by a plurality of areas of an image sensor. Each of the plurality of tunable filters 222 is tunable to transmit a selected wavelength within a respective spectral band, wherein the spectral bands of the plurality of tunable filters 222 are different from each other.

In other words, according to various embodiments, each micro-lens 212 and its corresponding optically coupled tunable filter 222 form a pair, and a plurality of pairs of micro-lens and tunable filter is formed by the micro-lens array 210 and the filter array 220. Each pair of micro-lens and tunable filter are configured to generate a spectrally filtered image within a respective spectral band, which respective spectral band is different from the spectral bands of other pairs of micro-lens and tunable filter. Accordingly, the plurality of spectrally filtered images generated by the plurality of pairs of micro-lens and tunable filter are spectrally distinct and different from each other.

In various embodiments, one or more of the plurality of tunable filters may be a band-pass filter configured to transmit a respective spectral band different from the spectral bands transmitted by the remaining of the plurality of tunable filters. The band-pass filter may pass a wavelength range from about an Angstrom to a few hundred nanometers. By way of example, the bandwidth of each tunable filter may be about 2 nm-80 nm, e.g., 10 nm, 20 nm, 50 nm, 70 nm, etc. In various embodiments, one or more of the tunable filters may be a narrow band-pass filter, which may have a bandwidth of about 2 nm-20 nm, for example. By way of example, one of the tunable filters may transmit a spectral band of 500 nm-510 nm, with a bandwidth of 10 nm.

Although the side view in FIG. 2 shows the micro-lens array 210 and the filter array 220 in a one-dimensional array, it is understood that the micro-lens array 210 and the filter array 220 may be two-dimensional arrays, such that each pair of micro-lens and the corresponding tunable filter generates a spectrally filtered image for receiving at a corresponding area of the image sensor.

In various embodiments, each tunable filter 222 may be or may include a Fabry-Perot filter (also referred to as an etalon), a Lyot filter, or an electrochromic window. The tunable filter 222 may be any other suitable types of tunable filters in other embodiments.

In various embodiments, the tunable filters 222 may include a material having at least one of a size or a refractive index that is variable in response to an electrical signal. In various embodiments, the tunable filters include at least one of a dielectric electroactive polymer material (e.g., elastomer), a piezoelectric material, a ferroelectric material, an electrochromic material, or a liquid crystal material.

In various embodiments, each tunable filter 222 may be configured to transmit a distinct spectral band different from the remaining tunable filters 222. In various embodiments, the spectral bands transmitted by the plurality of tunable filters 222 may be different from each other in that these spectral bands do not overlap with each other. In various embodiments, the spectral bands transmitted by the plurality of tunable filters 222 may be different from each other in that a peak wavelength of each spectral band corresponding to the maximum transmission is different from the peak wavelengths of the remaining spectral bands, or in that the FWHM (Full width at half maximum) of each spectral band is different from the FWHM of the remaining spectral bands.

In various embodiments, each tunable filter 222 is capable of transmitting one or more wavelengths or a range of wavelength within a predefined spectral band. In a default status of each tunable filter 222 without being tuned by an electrical signal, the tunable filter 222 may be configured to transmit a default wavelength or a default wavelength range within the predefined spectral band of the tunable filter 222. When the tunable filter 222 receives the electrical signal, the tunable filter 222 may be tuned to transmit another wavelength or wavelength range within the predefined spectral band of the tunable filter 222 but different from its default wavelength or wavelength range. The wavelength or wavelength range transmitted by the tunable filter 22 may be varied by adjusting the intensity of the applied electrical signal.

In various embodiments, when referring to the tunable filter 222 configured to transmit a wavelength, the wavelength may be understood to be a peak wavelength corresponding to the maximum transmission, or may be understood to be a narrow wavelength band covering the peak wavelength (such as the wavelength band corresponding to the FWHM (Full width at half maximum), or a sub-band within the FWHM), or a center wavelength being the midpoint wavelength of the FWHM. Accordingly, in the context of various embodiments, a selected wavelength transmitted by the tunable filter may refer to a single wavelength, or may refer to a wavelength range including the single wavelength with the single wavelength being the peak wavelength or the center wavelength of the wavelength range.

As shown in FIG. 2, the tunable filters 222 may be optically coupled to the micro-lenses 212 without being physically attached to each other. In other embodiments, each tunable filter 222 may be attached to a surface of a respective micro-lens 212. For example, the tunable filters 222 may be formed directly on a surface of the micro-lenses 212, e.g., as a layer of thin-film Fabry-Perot etalons formed on the surface of the micro-lenses 212. The plurality of micro-lenses 212 and the plurality of tunable filters 222 are arranged corresponding to the plurality of areas of the image sensor, such that each pair of micro-lens and the corresponding tunable filter generate a spectrally filtered image to be received on a corresponding area of the image sensor.

According to various embodiments, the hyperspectral imaging apparatus 200 may further include a controller configured to tune at least one of the tunable filters 222, such that the tunable filter 222 is tuned to transmit a selected wavelength.

In various embodiments, the controller may be configured to tune at least one of the tunable filters at different image capture times of the image sensor, such that each tunable filter being tuned by the controller is configured to generate separate spectrally filtered images at different wavelengths corresponding to different image capture times. In various embodiments, the controller is configured to synchronize the tuning of the filter array with the image capture at the image sensor.

In various embodiments, one or more of the tunable filters 222 may be configured to transmit a plurality of wavelengths simultaneously, such that one of these tunable filter 222 is able to generate separate spectrally filtered images at different wavelengths at the same image capture time. In various embodiments, the plurality of wavelengths simultaneously transmitted by the tunable filter may be a plurality of local peak wavelengths corresponding to local maximum transmission within the predefined spectral band of the tunable filter.

According to various embodiments, the hyperspectral imaging apparatus 200 is configured to operate in one or both of a first mode of a first spectral resolution and a second mode of a second spectral resolution, wherein the second spectral resolution is higher than the first spectral resolution. In the first spectral resolution mode, the plurality of tunable filters 222 are configured to generate the plurality of spectrally filtered images at an image capture time, i.e. a single image capture time, with or without tuning the plurality of tunable filters 222. In the second spectral resolution mode, the plurality of tunable filters are configured to generate different sets of spectrally filtered images at different image capture times by tuning the respective tunable filters 222 to transmit different wavelengths at different image capture times. Accordingly, more spectrally filtered images at more wavelengths are generated in the second spectral resolution mode, thereby achieving a higher spectral resolution.

In various embodiments, the hyperspectral imaging apparatus 200 may further include a converging lens for converging the plurality of spectrally filtered images towards the image sensor.

The hyperspectral imaging apparatus 200 as described in various embodiments above may be adapted for attachment to and detachment from the image sensor. For example, the image sensor may be included in a portable device, for example, in a camera of a mobile phone. Accordingly, the hyperspectral imaging apparatus 200 may be attached to the camera of the mobile phone, so as to provide hyperspectral imaging function in the mobile phone.

In various embodiments, the hyperspectral imaging apparatus 200 may include a power supply configured to supply an electrical signal for tuning the filter array. In other embodiments, an external power supply, for example, a power supply of the mobile phone to which the hyperspectral imaging apparatus 200 is attached, may be used to supply the electrical signal to the filter array of the hyperspectral imaging apparatus 200.

The hyperspectral imaging apparatus 200 of various embodiments may be temporarily attached to a camera to enable a compact hyperspectral imaging and image processing/analysis system for the average consumer. The compact nature of the system allows direct external integration onto handheld image capture devices, such as mobile camera phones and tablets. The hyperspectral imaging apparatus 200 of various embodiments may also function as a handheld UV-VIS-NIR (ultraviolet-visible-near infrared) spectrometer.

In various embodiments, the hyperspectral imaging apparatus 200 may include an internal image sensor, providing independent hyperspectral imaging functions without being attached to a camera.

Various embodiments provide a simple and compact optical system that can enable digital image capturing mobile devices to capture hyperspectral images/videos using the hyperspectral imaging apparatus 200. The mobile devices may also be installed with a software implementing a hyperspectral imaging method as described in various embodiments below to process and analyze the hyperspectral images.

The hyperspectral imaging apparatus and method of various embodiments have applications in many fields, such as cosmetics, skin-care, biometric identification (fingerprints and iris), color- or emission-based diagnostics, materials identification (e.g. mineralogy, gemstones), freshness sensing of food and perishables.

According to various embodiments above, the hyperspectral imaging apparatus includes an array of lens-lets and other necessary focusing optics, to split the imaged scene into an array of spatially separate, identical images. The hyperspectral imaging apparatus further includes an array of tunable filters, such as a layer of tunable thin-film Fabry-Perot etalons, built directly on the flat side of the array of lens-lets. Each lens-let has a corresponding etalon, which transmits a unique narrow spectral band. The tunable filters can be tuned slightly, so that in subsequent exposures of the same scene (e.g. in a burst mode of a camera), slightly different wavelengths are imaged. The multiple exposures can be combined to derive a hyperspectral data cube with a high spectral resolution. A controller and a power source may be included to tune the etalons either individually, or collectively. The controller may be configured to synchronize the wavelength tuning of the tunable filters with camera shutter. An image processing software may be installed in the image capture device, to refine the images and improve spectral resolution.

Various embodiments of the hyperspectral imaging apparatus 200 are described in more detail with reference to FIGS. 3-7 below.

Figure 3:
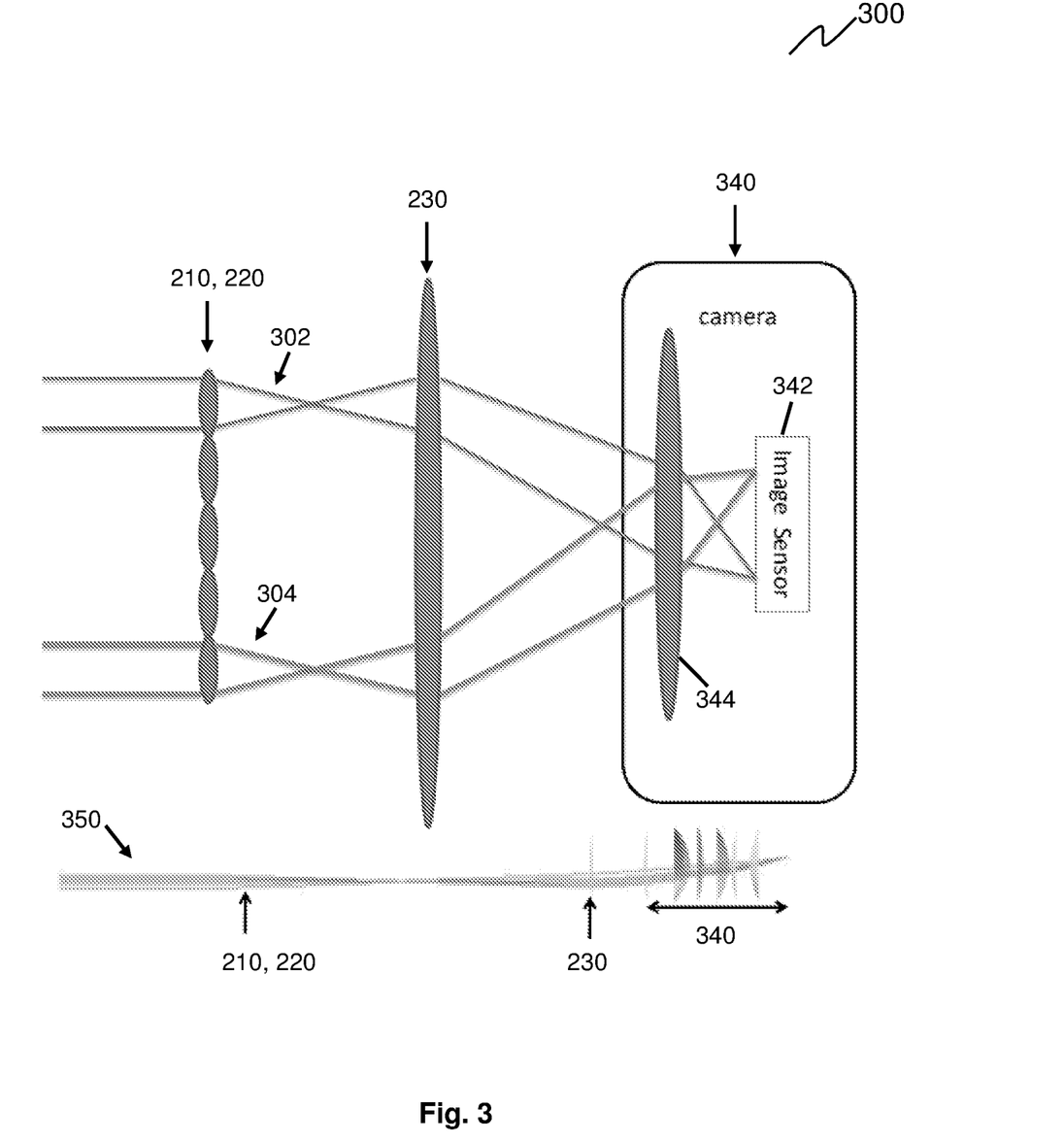
FIG. 3 shows an optical schematic of image formation using a hyperspectral imaging apparatus according to various embodiments.

FIG. 3 shows an optical schematic 300 of image formation using a hyperspectral imaging apparatus according to various embodiments.

In the embodiments shown in FIG. 3, the micro-lens array 210 and the filter array 220 are attached to each other, shown as a single array. In various embodiments, each micro-lens in the micro-lens array 210 may have a few hundred microns in diameter and pitch.

An optical simulation is carried out using a camera phone optical prescription, together with an objective micro-lens array 210 and a filter array 220 of the hyperspectral imaging apparatus 200 of various embodiments above. The objective of the optical design is to use the micro-lens array 210 that captures the scene as multiple identical images, and the filter array 220 that transmits different wavelengths at different tunable filters to generate spectrally distinct images 302, 304, optionally in conjunction with a converging lens 230 that re-converges the light rays to an angle that is acceptable by the optics (e.g. the image sensor 342) of the camera 340. The converging lens 230 may be included in the hyperspectral imaging apparatus 200, and may also be referred as a condensing lens. By way of example, the converging lens 230 may be an aspheric, achromatic lens. The spectrally distinct images are received at different areas of the image sensor 342. The camera 340 may also include one or more converging lenses 344 for further converging the received light rays towards the image sensor 342. Following this design principle, the hyperspectral imaging device becomes an 'add-on' accessory to a camera phone on which the camera 340 is provided, to allow hyperspectral imaging without making internal changes to the camera phone itself. A light path simulation 350 is shown across the optical components 210, 220, 230 of the hyperspectral imaging apparatus and the optical components of the camera module 340.

Figure 4:
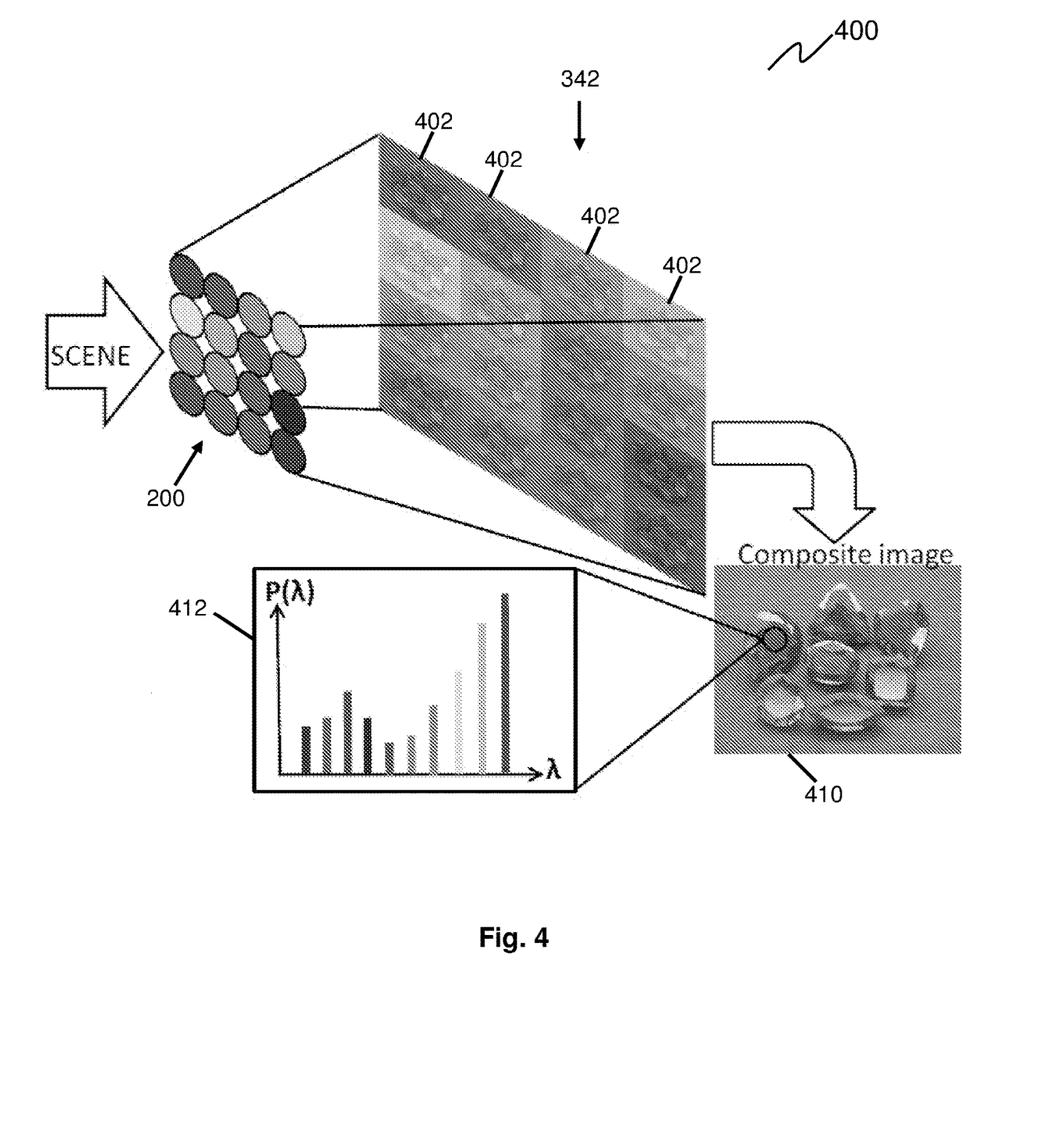
FIG. 4 shows a schematic illustrating the imaging of a hyperspectral imaging apparatus according to various embodiments.

FIG. 4 shows a schematic 400 illustrating the imaging of a hyperspectral imaging apparatus according to various embodiments.

As shown in FIG. 4, images of a scene are captured by the hyperspectral imaging apparatus 200, in which a plurality of images of the scene may be captured by the micro-lenses of the hyperspectral imaging apparatus 200 and spectrally filtered by the tunable filters of the hyperspectral imaging apparatus 200. The plurality of spectrally filtered images 402 of the scene generated by the hyperspectral imaging apparatus 200 are received by the image sensor 342, for example, at a plurality of areas of the image sensor 342 as shown in FIG. 4. The plurality of spectrally filtered images 402 may be combined to form a composite image 410 having full spectral information of the scene. A spectrum 412 of a pixel in the composite image is shown, which may be used to identify the object or the property of the object at this pixel. For example, by comparing the spectrum 412 of the pixel with the spectra in a database, it may be determined that the gemstone at this pixel location of the composite image 410 is real.

According to various embodiments above, each identical image copy 402 received on the image sensor is spectrally distinct, which is accomplished by the hyperspectral imaging apparatus 200 including a micro-lens array and a filter array. The hyperspectral imaging apparatus 200 may be produced by fabricating a unique tunable filter (e.g. thin-film Fabry-Perot filter) on top of each micro-lens. Therefore, the number of images 402 determines how many spectral 'bins' are captured, which defines the spectral resolution.

While forming N images on the image sensor 342 implies a spectral resolution of the wavelength range divided by N, it also means that the spatial resolution (e.g., the number of megapixels) of the camera is also divided by N. There is a compromise between spatial and spectral resolution as illustrated in FIG. 1.

By way of example, existing hyperspectral imager having 32 micro-lenses may replicate the image 402 of the scene for 32 times over a 2 megapixel CMOS image sensor. Over the specified spectral range of 600-1000 nm provided by the entire filter array, the spectral resolution is (1000-600)/32=13 nm. Each image 402 will be composed of 2/32=0.0625 megapixels, which is 256×256 pixels.

To increase spectral resolution, existing hyperspectral imager may be designed to have 128 micro-lenses, and accordingly 128 spectral bins will be provided by the filter array. Spectral resolution would be improved to 3 nm, but spatial resolution would drop to 128×128 pixels. This tradeoff between spectral resolution and spatial resolution is shown in FIG. 1, for example. For a given CMOS sensor and spectral range, (Pixel count)/(Spectral resolution)=Constant.

The hyperspectral imaging apparatus 200 of various embodiments overcomes the limitation of existing hyperspectral imager, by providing tunable filters in a filter array and controlling the operation of the tunable filters. Each filter can sweep a sub-range of wavelengths with multiple exposures (i.e. multiple image captures at different times). The filters may be electrically tunable by an applied electrical signal, such as Fabry-Perot filters, Lyot filters, liquid crystal tunable filters, or electrochromic windows. The hyperspectral imaging apparatus 200 of various embodiments is operable either in a low spectral-resolution snapshot/video mode, or in a high spectral resolution scan mode, or both, depending on the need of the user. The high spectral resolution mode is carried out by tuning the tunable filters in combination with a plurality of image captures at different times (e.g. using a burst mode of a camera).

The hyperspectral imaging apparatus 200 of the present application is illustrated using the above example, wherein the hyperspectral imaging apparatus 200 also includes 32 micro-lenses in this illustrative example. If each tunable filter (e.g., Fabry-Perot filter) of the hyperspectral imaging apparatus 200 can be tuned over a wavelength range of 11 nm, the spectral resolution can be increased from 13 nm to 2 nm, while maintaining the original pixel count of 256×256. This is achieved by taking 6 exposures (i.e. 6 image captures) at 6 different image capture times, wherein 32 spectrally distinct image copies are generated at each exposure.

Figure 5:
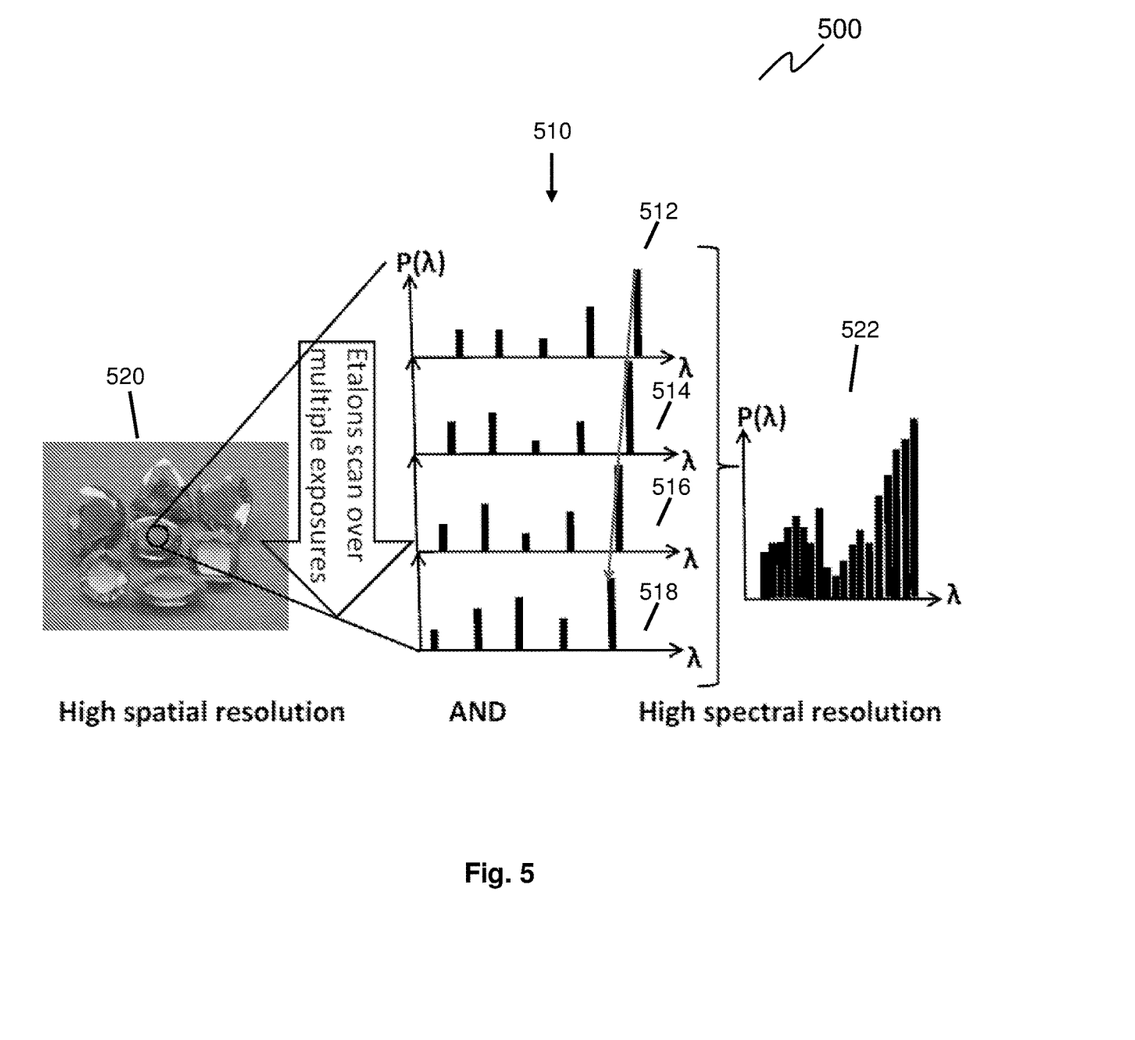
FIG. 5 shows a schematic illustrating a high spatial resolution and a high spectral resolution simultaneously achieved by the hyperspectral imaging apparatus of various embodiments.

FIG. 5 shows a schematic 500 illustrating a high spatial resolution and a high spectral resolution simultaneously achieved by the hyperspectral imaging apparatus 200 of various embodiments.

Multiple image captures 510 are performed at different times, such that at each image capture time, the tunable filters are tuned to transmit different wavelengths as illustrated by the spectra 512, 514, 516, 518. These different spectra 512, 514, 516, 518 can be combined to generate a combined spectrum 522 having higher spectral resolution. By using the hyperspectral imaging apparatus 200 of various embodiments and tuning the tunable filters at multiple image capture times, a composite image 520 with high spatial resolution and high spectral resolution is achieved.

The tunable filters 222 of the filter array 220 according to various embodiments above are described in more detail below.

The structure of the tunable filter, also referred to as etalon, may be a metal/dielectric/metal thin-film stack. The metallic surfaces are partially transmissive, so that light enters the stack and forms standing waves in the dielectric layer, if the wavelength and dielectric layer thickness matches. Selective transmission arises as a result of interference of specific wavelengths: destructive interference on the entry side, and constructive interference on the exit side. The thickness of the dielectric layer determines the transmitted wavelengths, according to:

$$T = \frac{(1-R^2)}{1+R^2 - 2R\cos(4\pi n l/\lambda)}$$

wherein R represents the reflectivity of the metal surfaces, n represents the refractive index of the dielectric, l represents the dielectric layer thickness, T represents the optical transmission at wavelength λ, and assuming the angle of incidence is small.

To allow the tunable filter 222 to scan over a range of wavelengths, the dielectric layer thickness may be configured to be tunable.

In various embodiments, the dielectric layer of the tunable filters 222 may include an elastomer, e.g. PDMS (Polydimethylsiloxane), or other dielectric electroactive polymers. The transmitted peak wavelength is equal to 2 nl/m (where m is an integer), to a first approximation. When a voltage is applied to the metal surfaces of the tunable filter, an electrostatic attraction between the metal films (e.g. silver films) compresses the dielectric layer and makes the tunable filter thinner, thereby selectively transmitting shorter wavelengths. This behavior of the dielectric layer is governed in accordance with the following equation:

$$\text{Strain} \frac{\Delta l}{l} = \frac{\varepsilon_0 \varepsilon_r}{E}\left(\frac{V}{l}\right)^2$$

wherein E represents the Young's Modulus of the dielectric, $\varepsilon_0\varepsilon_r$ represents the dielectric constant, and V represents the applied voltage.

In an exemplary embodiment, if the tunable filter is provided or configured to selectively transmit light of about 700 nm, a PDMS layer would be roughly 500 nm, assuming n~1.4. The DC voltage required to constrict the PDMS by 50 nm is about 2.4V. This assumes commercially-available soft PDMS with 5 kPa tensile strength, and a dielectric constant of 2.5 (e.g. Sylgard® 527). A 50 nm change in thickness would correspond to a 36 nm change in peak transmitted wavelength. This low voltage of about 2.4V is easily manageable for a portable device.

In another illustrative example, a calculation involving the thickest tunable filter that is required (voltage scales with square-root of thickness) is described.

When making use of the full spectral range of typical image sensors (e.g., silicon detectors have a spectral range of about 400-1200 nm), the thickest PDMS etalon would need to be at least 860 nm in order to select 1200 nm NIR (near infrared) light. If the filter array 220 includes 25 tunable filters, then each tunable filter would need to scan through a wavelength range of 32 nm. Accordingly, the PDMS layer would need to be able to change its thickness by 23 nm. An 8 megapixel camera (3264×2448) would become a 0.3 megapixel camera (653×490). Then the voltage required to constrict the 860 nm PDMS filter by 23 nm is about 2.1V, which is still an easily manageable voltage. If the required spectral resolution is, e.g., 5 nm, then a scan of 6-7 exposures would be needed. Typical camera phones already have a burst mode that can handle multiple exposures in less than a second, and thus 6-7 image captures can be performed quickly.

In various embodiments, the tunable filters 222 may include a piezoelectric material, e.g. PVDF (polyvinylidene difluoride), sandwiched between two metal layers to modulate the distance between the metallic surfaces depending on the electric field applied across the piezoelectric layer.

In various embodiments, the tunable filters 222 may include a material having a tunable refractive index, such as electrochromic material, ferroelectrics, or liquid crystals.

According to various embodiments, a controller is provided to control the tunable filters. In various embodiments, the controller may be configured to synchronize the tuning of the tunable filters with the image capture (e.g. by the camera shutter), so that exposures can be taken in synchronization with the filter scan. The link with the camera can be wired through the camera phone port, or can be wireless, e.g. through WiFi, or Bluetooth.

In the exemplary embodiments described above, the required voltage to control or tune the filters are less than 10V. This can be provided by a battery included in the hyperspectral imaging apparatus 200, or may be provided by the battery of the camera. According to various embodiments, the filter structure is a small-area capacitor charged by DC, and thus current flow should be very small and only low power needs to be supplied.

Figure 6:
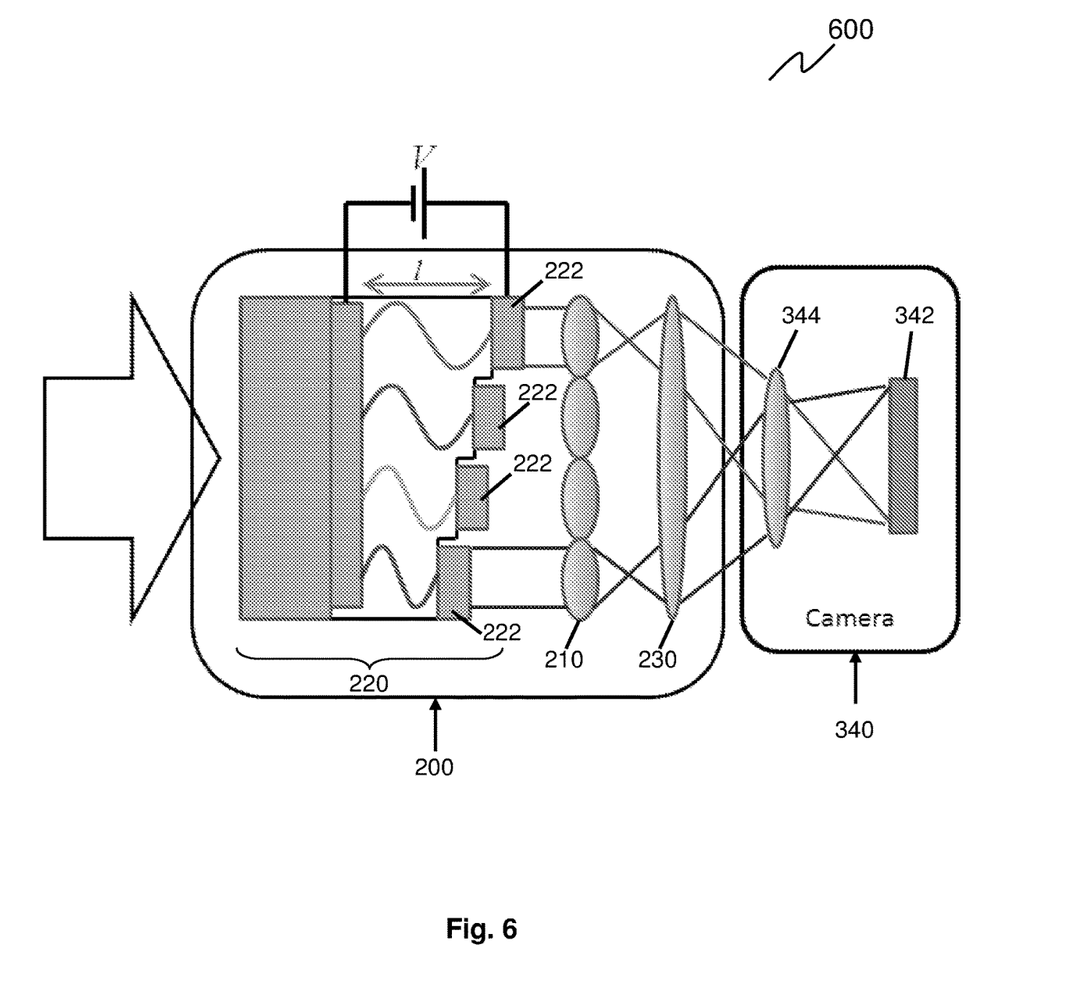
FIG. 6 shows a schematic illustrating the light transmission through the hyperspectral imaging apparatus according to various embodiments.

According to various embodiments in which the thickness of the tunable filter affects the transmitted wavelength, the filter array 220 may include the plurality of tunable filters with different thickness in order to provide a specified spectral range. FIG. 6 shows a schematic 600 illustrating the light transmission through the hyperspectral imaging apparatus 200 according to various embodiments.

As shown in FIG. 6, the hyperspectral imaging apparatus 200 includes the micro-lens array 210, the filter array 220 and the converging lens 230 described above. The relative arrangement between the micro-lens array 210 and the filter array 220 is exchangeable, so that incoming light can be first received by the micro-lens array 210 or by the filter array 220. In this exemplary embodiment, the filter array 220 is arranged to first receive the incoming light.

The tunable filters 222 in the filter array 220 have different thickness l from each other, and the thickness is further controllable by a voltage V applied to each of the tunable filter 222. As shown in FIG. 6, light of different wavelengths are transmitted through different tunable filters 222 with different thickness, which are then transmitted through the micro-lens array 210 and converged by the converging lens 230 for receiving by the image sensor 342 of the camera 340. The camera may include one or more converging lens 344 for further converging the received light towards the image sensor 342.

Figure 7:
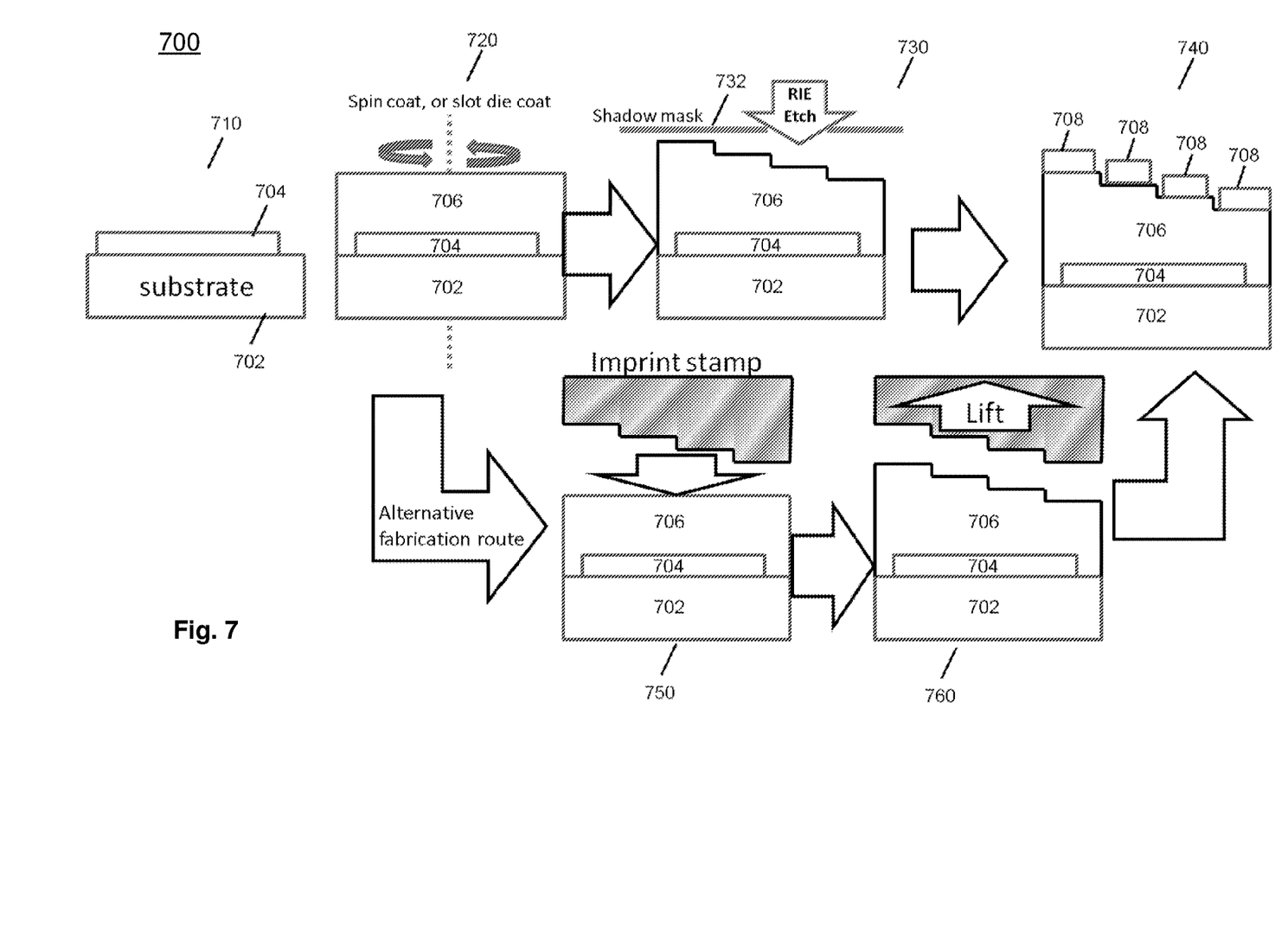
FIG. 7 shows a process for fabricating the filter according to various embodiments.

FIG. 7 shows a process 700 for fabricating the filter array 220 (e.g. as shown in FIG. 6) according to various embodiments.

At 710, a substrate 702, e.g. a glass substrate, is provided, and a partially reflective metal film 704, e.g. Ag (silver) film, is formed on the glass substrate 702.

At 720, a dielectric layer 706 which has tunable thickness or a layer with a material of tunable refractive index is formed on the Ag film 704 by spin coat, or slot die coat, or other suitable depositing technologies. The dielectric layer 706 may be a PDMS layer or similar colorless elastomer layer, for example. The dielectric layer 706 may be other suitable materials as described in various embodiments above. After the depositing process, the PDMS layer 706 cures at 70° C. for 2 hrs, before the etching process in 730 below.

At 730, a RIE (Reactive-ion etching) etching process is carried out using a shadow mask 732 to etch the dielectric layer 706 into a plurality of portions of different thickness. Illustratively, the plurality of portions of the dielectric layer 706 with different thickness is shown as a layer 706 with a stepped surface.

At 740, a plurality of metal films 708, e.g., partially reflective Ag films, is formed on the plurality of portions of the dielectric layer 706 using thermal evaporation through the shadow mask 732. Accordingly, the filter array 220 have multiple tunable filers of different thickness are formed.

In another embodiment, as an alternative to the RIE etching at 730, imprint stamp may be applied on the dielectric layer 706 at 750 and may be lifted at 760, so as to form the filter array 220 having multiple tunable filers of different thickness as shown at 740. In this exemplary embodiment, the imprint stamping is carried out while the PDMS layer 706 cures under a temperature of about 70° C. for 2 hours, so that the PDMS layer 706 cures with the imprint pattern.

According to various embodiments, one or more of the tunable filters 222 of the filter array 220 may be configured to transmit multiple wavelengths simultaneously, since the camera image sensor may have a Bayer filter. For example, a tunable filter 222 transmitting at 1200 nm wavelength may also transmit 600 nm and 400 nm wavelengths. Since the red Bayer filter covers both 1200 nm and 600 nm wavelengths, an additional filter may be provided to cut out the 600 nm light so that 1200 nm and 600 nm images don't overlap, while allowing both 1200 nm and 400 nm light to be detected by the image sensor. The Bayer filter of the image sensor will then allow spectral filtered images at both 1200 nm and 400 nm. This would increase the number of spectral bins in a single exposure, and thus increases the spectral resolution.

In various embodiments, a hyperspectral imaging method may be provided, which may be carried out by the hyperspectral imaging apparatus 200 described above. The hyperspectral imaging method may include generating a first set of spectrally distinct images at a first image capture time, and generating a second set of spectrally distinct images at a second image capture time different from the first image capture time. The second set of spectrally distinct images is generated at different wavelengths from the first set of spectrally distinct images. The hyperspectral imaging method may further include generating one or more further sets of spectrally distinct images at one or more further image capture times different from the first and the second image capture times.

In various embodiments, the various sets of spectrally distinct images may be generated using a micro-lens array and a filter array optically coupled to the micro-lens array. The filter array includes a plurality of tunable filters, each of which being tunable to transmit a selected wavelength within a distinct spectral band. The first set of spectrally distinct images may be generated without tuning the filter array, i.e. at a default state of the filter array, or may be generated by tuning the filter array to transmit a respective selected wavelength at each of the tunable filters. The second set or the further sets of spectrally filtered images may be generated by tuning the tunable filters, such that each tunable filter transmits a different wavelength at different image capture times.

The hyperspectral imaging method carried out by the hyperspectral imaging apparatus 200 according to various embodiments above may generate and acquire different sets of spectrally distinct images at different wavelengths and different image capture times. Various embodiments may further provide a hyperspectral imaging method which may process various sets of spectrally distinct images to determine or acquire a hyperspectral image as will be described below.

Figure 8:
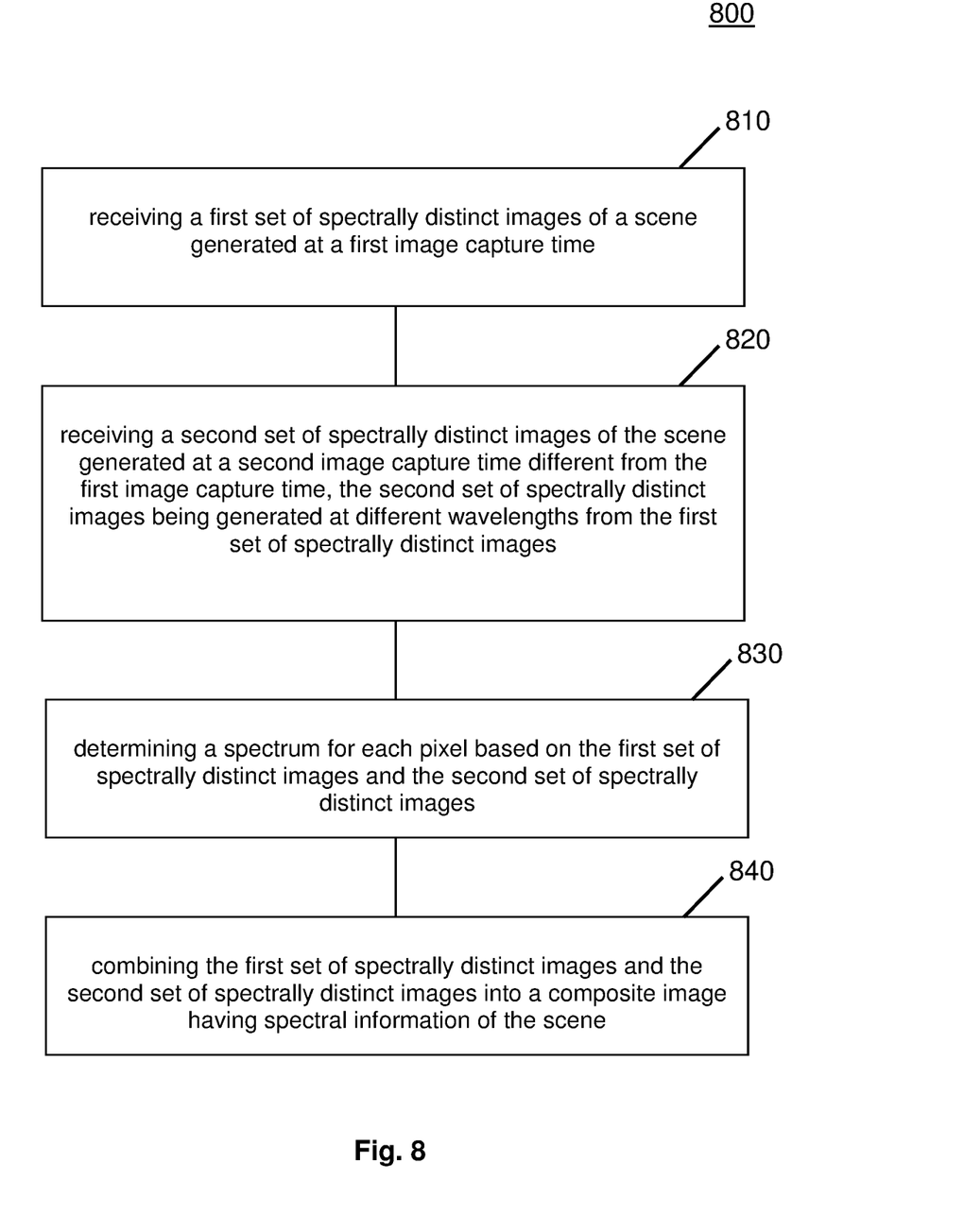
FIG. 8 shows a flowchart illustrating a hyperspectral imaging method according to various embodiments.

FIG. 8 shows a flowchart 800 illustrating a hyperspectral imaging method according to various embodiments.

At 810, a first set of spectrally distinct images of a scene generated at a first image capture time are received.

At 820, a second set of spectrally distinct images of the scene generated at a second image capture time different from the first image capture time are received. The second set of spectrally distinct images is generated at different wavelengths from the first set of spectrally distinct images.

At 830, a spectrum is determined for each pixel based on the first set of spectrally distinct images and the second set of spectrally distinct images.

At 840, the first set of spectrally distinct images and the second set of spectrally distinct images are combined into a composite image having spectral information of the scene.

In other words, various embodiments provide a hyperspectral imaging method, in which spectrally distinct images generated at more than one image capture times are received and combined to form a hyperspectral composite image having full spectral information of the scene in a higher spectral resolution.

In various embodiments, the composite image may be referred to as a hyperspectral image, which may be determined based on the determined spectrum for each pixel. Illustratively, the composite image may be determined by combining the spectra determined for all pixels.

In this context, a spectrally distinct image refers to an image which is spectrally filtered at a unique wavelength or a unique wavelength range. Accordingly, each image of the first set of spectrally distinct images is generated at a wavelength or a wavelength range different from the remaining images of the first set of spectrally distinct images and different from the second set of spectrally distinct images. Each image of the second set of spectrally distinct images is generated at a wavelength or a wavelength range different from the remaining images of the second set of spectrally distinct images and different from the first set of spectrally distinct images.

According to various embodiments, the hyperspectral imaging method may further include compensating at least one of the first set or the second set of spectrally distinct images based on at least one of the following characteristics:

a spectral transmission and response characteristics of an image sensor used for capturing and receiving the spectrally distinct images;

a spectral transmission characteristics of a plurality of tunable filters used for generating the spectrally distinct images; or a spectral composition of a light source used for capturing the spectrally distinct images.

According to various embodiments, the hyperspectral imaging method may further include identifying a target object captured in the spectrally distinct images based on the spectral information of the composite image. The target object may be identified by comparing the spectra of the object area with predetermined spectra in a database. In various embodiments, the hyperspectral imaging method may further include determining the material, composition and/or other characteristics of the identified object based on the spectral information of the object area.

In various embodiments, the hyperspectral imaging method may further include generating the first set of spectrally distinct images using a micro-lens array and a filter array optically coupled to the micro-lens array. The filter array includes a plurality of tunable filters, each of which being tunable to transmit a selected wavelength within a distinct spectral band. The first set of spectrally distinct images may be generated without tuning the filter array, i.e. at a default state of the filter array, or may be generated by tuning the filter array to transmit a selected wavelength at each of the tunable filters.

In various embodiments, the hyperspectral imaging method may further include generating the second set of spectrally distinct images by tuning the tunable filters, such that each tunable filter transmits a wavelength at the second image capture time different from a wavelength transmitted at the first image capture time.

The first set of spectrally distinct images and the second set of spectrally distinct images may be generated by the hyperspectral imaging apparatus 200 described above. Various embodiments of the hyperspectral imaging apparatus 200 described above are analogously valid for the hyperspectral imaging method, and vice versa.

In various embodiments, the tuning of the tunable filters is synchronized with the second image capture time, thereby generating the second set of spectrally distinct images at the second image capture time. An image sensor may be used for capturing and receiving the spectrally distinct images at the first image capture time and the second image capture time. A controller may be used for synchronizing the tuning of the tunable filters with the image capture time at the image sensor.

According to various embodiments, one or more further sets of spectrally distinct images of the scene generated at one or more further image capture times different from the first image capture time and the second image capture time may be received, wherein the one or more further sets of spectrally distinct images are generated at different wavelengths from the first set of spectrally distinct images and the second set of spectrally distinct images. The spectrum for each pixel may be determined based on the first set of spectrally distinct images, the second set of spectrally distinct images, and the one or more further sets of spectrally distinct images. The first set of spectrally distinct images, the second set of spectrally distinct images and the one or more further sets of spectrally distinct images may be combined into the composite image including spectral information of the scene.

Figure 9:
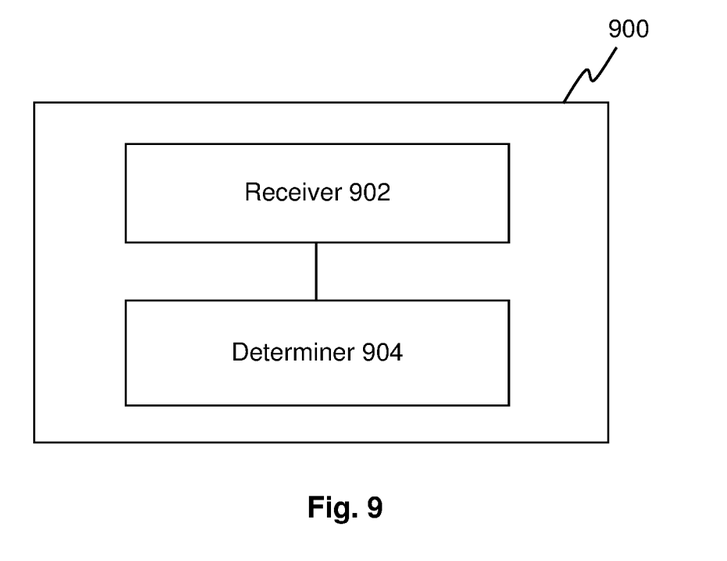
FIG. 9 shows a schematic diagram of a hyperspectral image processing apparatus according to various embodiments.

According to various embodiments, a hyperspectral image processing apparatus may be provided for carrying out the hyperspectral imaging method described in the embodiments above. FIG. 9 shows a schematic diagram of a hyperspectral image processing apparatus 900 according to various embodiments. Embodiments described in context with the hyperspectral imaging method of FIG. 8 above are analogously valid for the hyperspectral image processing apparatus 900 and vice versa.

The hyperspectral image processing apparatus 900 may include a receiver 902 configured to receive a first set of spectrally distinct images of a scene generated at a first image capture time, and a second set of spectrally distinct images of the scene generated at a second image capture time different from the first image capture time. The second set of spectrally distinct images is generated at different wavelengths from the first set of spectrally distinct images. In various embodiments, the first set and the second set of spectrally distinct images may be generated by the hyperspectral imaging apparatus 200 described above.

The hyperspectral image processing apparatus 900 may further include a determiner 904 configured to determine a spectrum for each pixel based on the first set of spectrally distinct images and the second set of spectrally distinct images, and combine the first set of spectrally distinct images and the second set of spectrally distinct images into a composite image.

In various embodiments, the receiver 902 may be configured to receive one or more further sets of spectrally distinct images of the scene generated at one or more further image capture times different from the first image capture time and the second image capture time may be received. The one or more further sets of spectrally distinct images are generated at different wavelengths from the first set of spectrally distinct images and the second set of spectrally distinct images. The determiner 904 may be configured to determine the spectrum for each pixel based on the first set of spectrally distinct images, the second set of spectrally distinct images, and the one or more further sets of spectrally distinct images. The determiner 904 may be further configured to combine the first set of spectrally distinct images, the second set of spectrally distinct images and the one or more further sets of spectrally distinct images into the composite image including spectral information of the scene.

According to various embodiments, the hyperspectral image processing apparatus 900 may further include a compensator (not shown) configured to compensate one or more of the first set, the second set, or the further sets of spectrally distinct images based on at least one of the following characteristics: a spectral transmission and response characteristics of an image sensor used for capturing and receiving the spectrally distinct images; a spectral transmission characteristics of a plurality of tunable filters used for generating the spectrally distinct images; or a spectral composition of a light source used for capturing the spectrally distinct images.

According to various embodiments, the hyperspectral image processing apparatus 900 may further include an object identifier (not shown) configured to identify a target object captured in the spectrally distinct images based on the spectral information of the composite image.

The components of the hyperspectral image processing apparatus 900 (e.g. the receiver 902, the determiner 904, the compensator, the object identifier) may for example be implemented by one or more circuits. A "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In various embodiments, the hyperspectral image processing device 900 may include a single processor configured to carry out the processes performed in the receiver 902, the determiner 904, the compensator, and the object identifier.

The hyperspectral image processing apparatus 900 may include a memory configured to store the received first set of spectrally distinct images and second set of spectrally distinct images. The memory may also be configured to store a program or software, which when executed by a processor, causes the processor to perform the hyperspectral imaging method described above.

In various embodiments, the hyperspectral image processing apparatus 900 may be or may include a computer program product, e.g. a non-transitory computer readable medium, storing a program or instructions which when executed by a processor causes the processor to carry out the hyperspectral imaging method of various embodiments above.

According to various embodiments, a non-transitory computer readable medium with a program stored thereon for carrying out the hyperspectral imaging method described above is provided. The program when executed by a processor causes the processor to receive the first set of spectrally distinct images and the second set of spectrally distinct images generated at different image capture times and different wavelengths, determine a spectrum for each pixel based on the first set of spectrally distinct images and the second set of spectrally distinct images, and combine the first set of spectrally distinct images and the second set of spectrally distinct images into the composite image.

According to various embodiments, a hyperspectral imaging system may be provided. The system may include the hyperspectral imaging apparatus 200 configured to generate a plurality of sets of spectrally distinct images at different wavelengths and at different image capture times, and may include the hyperspectral image processing apparatus 900 configured to determine a composite image based on the plurality of sets of spectrally distinct images, as described in various embodiments above.

Illustratively, the hyperspectral imaging method described above may be implemented by a software, which may be installed on a portable device, e.g., a mobile phone, and may be downloaded as an app. The software, when executed, may perform the hyperspectral imaging method described above.

In an exemplary embodiment, the software may be executed to perform the following functions.

1) Extract the raw images from the camera, taking into account the Bayer filter transmission characteristics of individual image capturing device models.

2) Calculate the spectrum at each pixel, taking into consideration of a) spectral transmission of the tunable filters, b) spectral response of the camera detector (with its Bayer filter), c) spectral composition of the camera flash, or other light source used. These simple calculations can be performed on the phone. Mathematical techniques, such as regularization, can improve the spectral resolution beyond the FWHM (full width at half maximum) of the tunable filters when the scanning mode is used. Such complex calculations may be performed in the cloud by a server.

3) Combine the stack of spectrally-distinct images into one composite image, e.g. one RGB image, for a user to interpret the image more easily.

4) Search in a database (either in the camera phone storage or in the cloud) to identify substances based on the spectral data.

Figure 10:
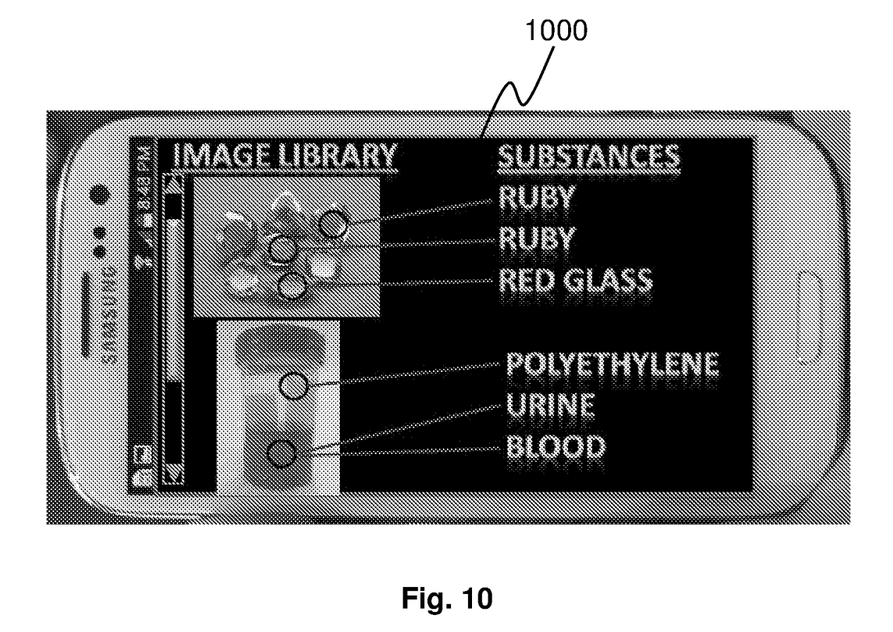
FIG. 10 shows a user interface of a software according to various embodiments.

FIG. 10 shows a user interface 1000 of the software according to various embodiments, which allows a user to touch a portion of the image. The software may then display the material, composition and/or other characteristics of the touched portion of the image determined by the software. Alternatively, the software may allow the user to choose a mapping function to map out the location and concentration of the substance of interest on the image.

According to various embodiments above, a hyperspectral imaging apparatus can be attached externally and non-permanently to a camera phone to enable it to record hyperspectral image cubes, without the need for changes to the camera phone itself.

The hyperspectral imaging apparatus of various embodiments includes a system of lenses, including one or more lens arrays, that forms multiple copies of the scene image onto the camera phone's image sensor. Each image forms on a different area of the sensor. The hyperspectral imaging apparatus includes a filter array, such chat each separate image is spectrally filtered by a unique etalon that shares its optical axis with a lens of the lens array. Therefore, each distinct image that is detected at the image sensor is spectrally unique. Each etalon is electrically tunable and can be used to scan over a small spectral range not otherwise covered by the etalon default transmittance. This allows the image sensor to take separate exposures at different wavelengths, so as to achieve finer spectral resolution. According to various embodiments, a controller is provided to synchronize camera exposure with the etalon tuning. A power source is also provided to drive the etalon tuning.

According to various embodiments, a software algorithm is provided which constructs the hyperspectral data cube from the raw image data with resolution higher than that limited by the physical device, and then searches a database for derivable information. Useful information about the image can then be displayed on the screen as required by the user.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A hyperspectral imaging apparatus, comprising:
a micro-lens array comprising a plurality of micro-lenses;
a filter array comprising a plurality of tunable filters, each of the plurality of tunable filters being optically coupled to a respective micro-lens of the plurality of micro-lenses; and
a controller configured to tune at least one of the tunable filters;
wherein each micro-lens and the corresponding coupled tunable filter are configured to generate a spectrally filtered image of a scene, such that the micro-lens array and the filter array generate a plurality of spectrally filtered images of the scene for receiving by a plurality of areas of an image sensor;
wherein each of the plurality of tunable filters is tunable to transmit a selected wavelength within a respective spectral band, wherein the spectral bands of the plurality of tunable filters are different from each other; and
wherein the controller is configured to tune at least one of the tunable filters at different image capture times of the image sensor, such that each tunable filter being tuned by the controller is configured to generate separate spectrally filtered images at different wavelengths corresponding to different image capture times.

2. The hyperspectral imaging apparatus of claim 1, wherein each tunable filter comprises one of a Fabry-Perot filter, a Lyot filter, or an electrochromic window.

3. The hyperspectral imaging apparatus of claim 1, wherein the tunable filters comprise a material having at least one of a size or a refractive index that is variable in response to an electrical signal.

4. The hyperspectral imaging apparatus of claim 1, wherein each tunable filter is attached to a surface of a respective micro-lens, wherein the plurality of micro-lenses and the plurality of tunable filters are arranged corresponding to the plurality of areas of the image sensor.

5. The hyperspectral imaging apparatus of claim 1, wherein the controller is configured to synchronize the tuning of the filter array with the image capture at the image sensor.

6. The hyperspectral imaging apparatus of claim 1, wherein one or more of the tunable filters is configured to transmit a plurality of wavelengths simultaneously.

7. The hyperspectral imaging apparatus of claim 1, wherein the hyperspectral imaging apparatus is configured to operate in one or both of a first mode of a first spectral resolution and a second mode of a second spectral resolution, the second spectral resolution being higher than the first spectral resolution;
wherein in the first spectral resolution mode, the plurality of tunable filters are configured to generate the plurality of spectrally filtered images at an image capture time;
wherein in the second spectral resolution mode, the plurality of tunable filters are configured to generate different sets of spectrally filtered images at different image capture times by tuning the respective tunable filters to transmit different wavelengths at different image capture times.

8. The hyperspectral imaging apparatus of claim 1, further comprising:
a converging lens for converging the plurality of spectrally filtered images towards the image sensor.

9. The hyperspectral imaging apparatus of claim 1, being adapted for attachment to and detachment from the image sensor, the image sensor being comprised in a portable device.

10. The hyperspectral imaging apparatus of claim 1, further comprising
a power supply configured to supply an electrical signal for tuning the filter array.

11. The hyperspectral imaging apparatus of claim 1, wherein each tunable filter comprises:
a first metal layer;
a second metal layer; and
a piezoelectric layer between the first metal layer and the second layer, the piezoelectric layer comprising a piezoelectric material;
wherein the piezoelectric material is configured to modulate a distance between the first metal layer and the second metal layer based on an electric field applied across the piezoelectric material.

12. The hyperspectral imaging apparatus of claim 1, wherein each tunable filter comprises a dielectric layer comprising an elastomer.

* * * * *